Figure 4:
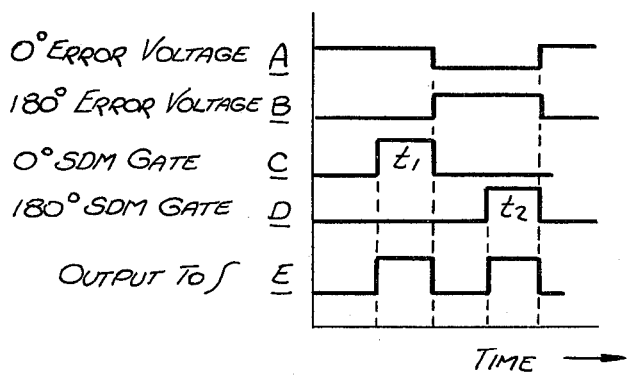

United States Patent [19]

Schmoock et al.

[11] 4,227,408
[45] Oct. 14, 1980

[54] HARMONIC NOISE SUPPRESSION IN ELECTROMAGNETIC FLOWMETER

[75] Inventors: Roy F. Schmoock, Yardley; John S. Yard, Doylestown, both of Pa.

[73] Assignee: Fischer & Porter Company, Warminster, Pa.

[21] Appl. No.: 967,137

[22] Filed: Dec. 7, 1978

[51] Int. Cl.² .............................................. G01F 1/60
[52] U.S. Cl. ................................................ 73/861.17
[58] Field of Search ................................... 73/194 EM

[56] References Cited
U.S. PATENT DOCUMENTS

| 3,783,687 | 1/1974 | Mannherz et al. | 73/194 EM |
| 4,159,645 | 7/1979 | Cushing | 73/194 EM |

*Primary Examiner*—Charles A. Ruehl
*Attorney, Agent, or Firm*—Michael Ebert

[57] ABSTRACT

An electromagnetic flowmeter in which fluid to be metered passes through a flow tube to intersect a magnetic field whereby the voltage induced in the field is transferred to a pair of electrodes mounted in the flow tube to yield a flow-induced signal. This field is established by an electromagnet supplied with excitation current through a periodically-operated switch to create a magnetic field which during each operating cycle is alternately turned on and off or reversed in flux direction at a predetermined drive frequency, as a consequence of which the signal includes undesirable noise components formed by even and odd harmonics of the drive frequency. To suppress such harmonic noise, the flow-induced signal is applied to a converter that includes a pair of synchronous demodulators operating in phase opposition and so synchronized with the periodically-operated switch that one demodulator passes its output to an integrator during the first half cycle of the drive frequency only in a gating interval in which the magnetic field is turned on and is at a constant flux level, and the other demodulator thereafter passes its output to the same integrator during the second half cycle only in a gating interval in which the magnetic field is turned off or is at a constant flux level in the reverse direction.

8 Claims, 8 Drawing Figures

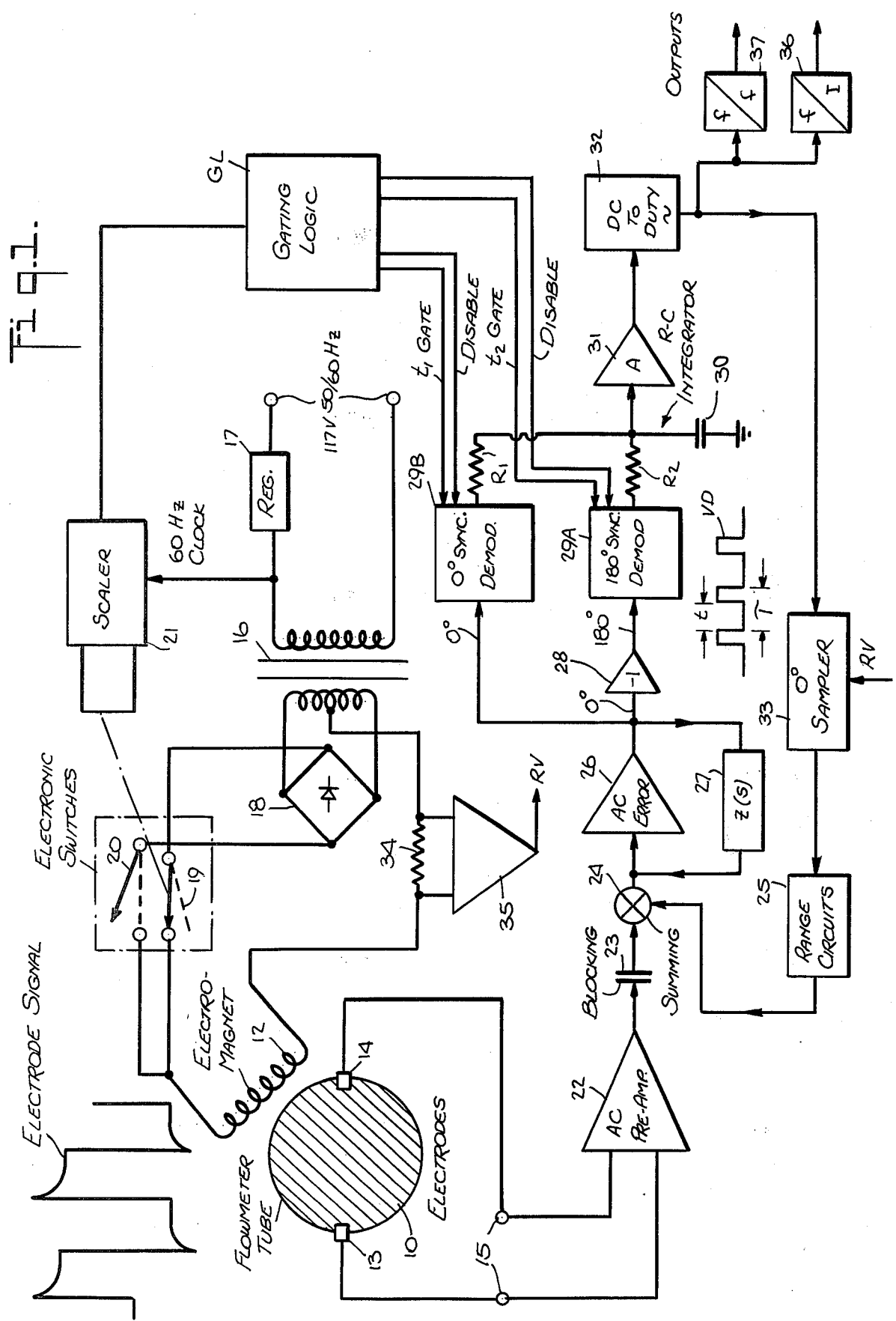

HARMONIC NOISE SUPPRESSION IN ELECTROMAGNETIC FLOWMETER

BACKGROUND OF INVENTION

This invention relates generally to an electromagnetic flowmeter whose electromagnet is excited by an alternating or pulsatory current having a predetermined drive frequency to produce an output signal indicative of flow rate, and more particularly to a system in which noises in the signal rising from harmonics of the drive frequency are suppressed.

In a conventional electromagnetic flowmeter, the fluid whose flow rate is to be measured is conducted through a flow tube provided with a pair of diametrically-opposed electrodes, a magnetic field perpendicular to the longitudinal axis of the tube being established by an electromagnet. When the fluid intersects this field, a voltage is induced therein which is transferred to the electrodes. This voltage, which is proportional to the average velocity of the fluid and hence to its average volumetric rate, is then amplified and processed to yield an output signal for actuating a recorder or indicator, or for carrying out various process control operations.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation is clearly advantageous in that polarization is obviated and the A-C flow-induced signal may be more easily amplified, it has distinct drawbacks. The use of an alternating flux introduces spurious voltages that are unrelated to flow rate and, if untreated, give rise to inaccurate indications. The two spurious voltages that are most troublesome are stray capacitance-coupled voltages from the coil of the electromagnet to the electrodes, and induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

Pure "quadrature" voltage has heretofore been minimized by an electronic arrangement adapted to buck out this component, but limination of its in-phase component has not been successful. Existing A-C operated electromagnetic flowmeters are also known to vary their calibration as a function of temperature, fluid conductivity, pressure and other effects which can alter the spurious voltages both with respect to phase and magnitude. Hence it becomes necessary periodically to manually re-zero the meter to correct for the effects on zero by the above-described phenomena.

All of the adverse effects encountered in A-C operation of electromagnetic flowmeters can be attributed to the rate of change of the flux field $(d\phi)/dt$, serving to induce unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous d-c operation, the ideal condition $d\phi/dt=0$ is satisfied. But d-c operation to create a steady state field is not acceptable, for galvanic potentials are produced and polarization is encountered, as previously explained. In order, therefore, to obtain the positive benefits of a steady state field without the drawbacks which accompany continuous d-c operation, the U.S. Pat. No. 3,783,687 to Mannherz et al. discloses an excitation arrangement in which the steady state flux field is periodically reversed or interrupted. The entire disclosure of this patent is incorporated herein by reference.

In the Mannherz et al. patent, in order to avoid the spurious voltages which result from stray couplings without, however, causing polarization of the electrodes, the electromagnet is energized by a low-frequency square wave. This wave is produced by applying the output voltage of an unfiltered full-wave rectifier to the electromagnet and periodically reversing the voltage polarity at a low-frequency rate by means of an electronic switch.

Since the steady state field produced by the square wave is disrupted by switching transients occurring at the points of reversal, the converter to which the signal from the electrodes is applied includes a demodulator which is gated synchronously with the electronic switch to yield an output signal only when the magnetic flux achieves a steady state condition.

While this Mannherz et al. system avoids spurious voltages, it fails to take into account harmonic noise. Because the excitation current for driving the electromagnet has a predetermined frequency, the flow-induced signal yielded by the electrodes contains harmonic noise components which are even and odd harmonics of the drive frequency. These noises result in a less favorable signal-to-noise ratio and impair the reliability and efficiency of the flowmeter.

SUMMARY OF INVENTION

In view of the foregoing, the main object of this invention is to provide an electromagnetic flowmeter whose electromagnet is driven by an alternating or pulsatory current having a predetermined frequency in which noise components in the signal arising from harmonics of the drive frequency are suppressed to yield an output signal having a favorable signal-to-noise ratio.

More particularly, it is an object of this invention to provide a flowmeter of the above type which operates reliably and efficiently and which includes a pair of synchronous demodulators operating in phase opposition in conjunction with a common integrator to cancel out selected odd and all even harmonic noise components.

Briefly stated, these objects are attained in an electromagnetic flowmeter in accordance with the invention in which the fluid to be metered passes through a flow tube to intersect a magnetic field, whereby the voltage induced in the fluid is transferred to a pair of electrodes mounted at diametrically-opposed positions on the flow tube to yield a flow-induced signal. This field is established by an electromagnet whose coil is supplied with excitation current through a periodically-operated electronic switch to create a magnetic field which, during each operating cycle, is alternately turned on and off or reversed in flux direction at a predetermined drive frequency, as a consequence of which the signal includes desirable noise components formed by even and odd harmonics of the drive frequency. To suppress such noise, the flow-induced signal is applied to a converter that includes a pair of synchronous demodulators operating in phase opposition and so synchronized with the periodically-operated switch that one demodulator passes its output to an integrator during the first half cycle of the drive frequency only in a gating interval $t_1$ in which the magnetic field is turned on and is at a constant flux level, and the other demodulator thereafter passes its output to the same integrator during the second half cycle only in a gating interval $t_2$ in which the magnetic field is turned off or is at a constant flux level in the reverse direction.

The gating intervals $t_1$ and $t_2$ are of substantially equal duration, and the time gap $\Delta t$ therebetween is equal to an odd number of full half cycles of an odd harmonic of the drive frequency whereby all even and selected odd harmonics in the unwanted noise components are cancelled out in the integrator and the output signal yielded by the converter is free of noise components as well as spurious voltage arising from stray couplings.

OUTLINE OF DRAWINGS

Figure 2:
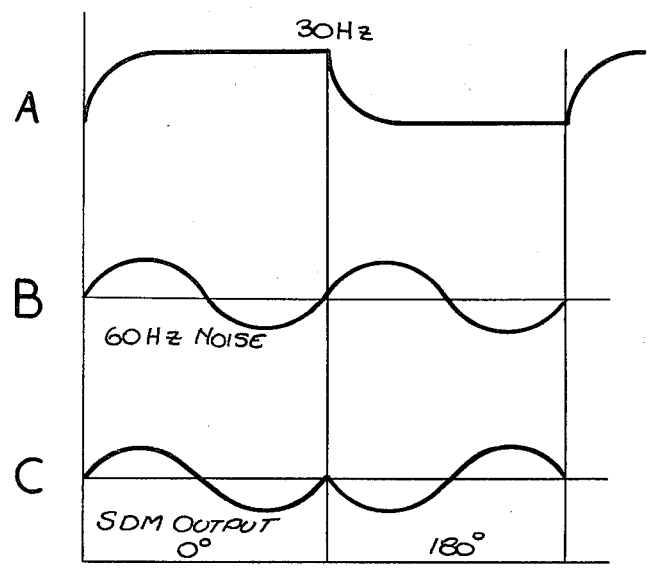
Figure 3:
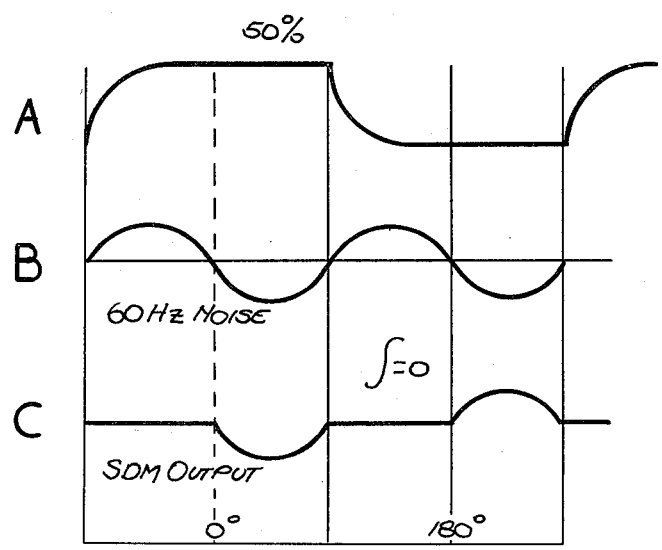
Figure 5:
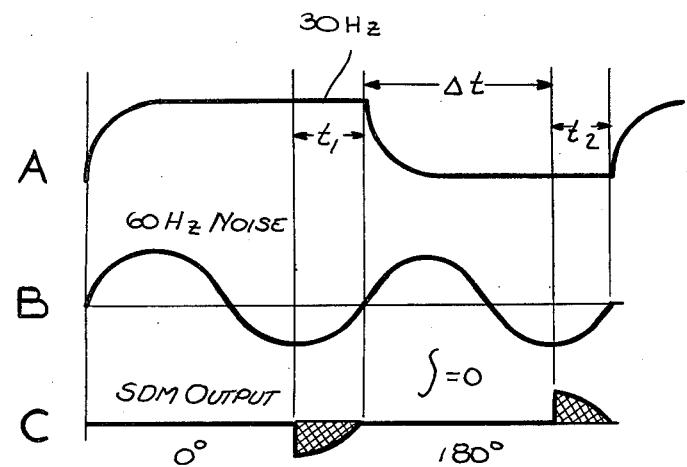
Figure 6:
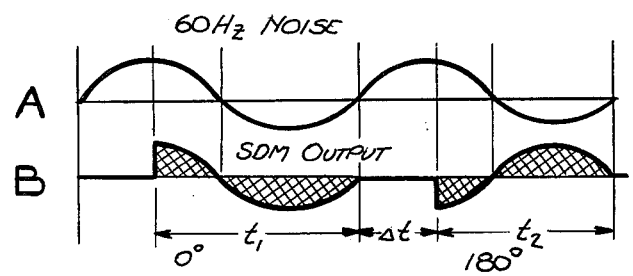
Figure 7:
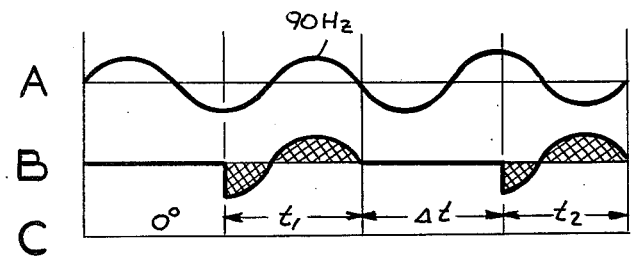
Figure 8:
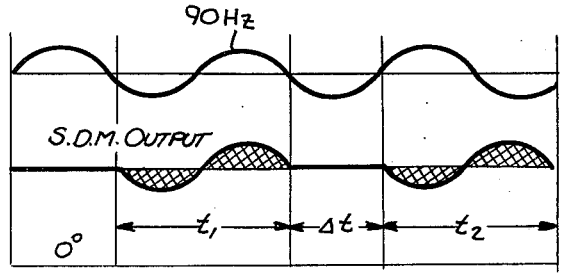

For a better understanding of the invention as well as other objects and further features thereof, reference is made to the following detailed description to be read in conjunction with the accompanying drawings, wherein:

FIG. 1 is a block diagram of an electromagnetic flowmeter system including a harmonic noise-cancellation circuit in accordance with the invention;

FIG. 2 consists of waveforms A, B and C illustrating the relationship between the drive and harmonic frequencies in the circuit;

FIG. 3 consists of waveforms A, B and C illustrating how the demodulators produce outputs in relation to an even harmonic of the drive frequency;

FIG. 4 consists of waveforms A to E illustrating the relationship of the gating pulses to the flow-induced signal;

FIG. 5 consists of waveforms A, B and C illustrating how an even-order harmonic noise component is suppressed by relatively short gating intervals;

FIG. 6 consists of waveforms A and B illustrating how an even-order harmonic noise component is suppressed by longer gating intervals;

FIG. 7 consists of waveforms A, B and C illustrating a gating interval condition which fails to suppress an odd-order harmonic; and FIG. 8 consists of waveforms, A, B and C illustrating a gating interval condition which succeeds in suppressing an odd order harmonic.

DESCRIPTION OF INVENTION

The Flowmeter Primary

Referring now to FIG. 1, there is shown a flowmeter system in accordance with the invention, constituted by a primary in the form of an electromagnetic flowmeter adapted to produce a low-level a-c signal output whose amplitude is proportional to the flow rate of the liquid being measured, and a secondary or converter which converts this low level a-c signal to a proportional d-c current output signal which is free of harmonic noises and quadrature effects.

In addition to the analog d-c current output, the secondary also yields a pulse output whose frequency is proportional to flow rate, the pulse output being useful in operating digital registers, counters or batch control systems. By means of proper scale factoring, registry of total accumulated flow may be integrated from this rate signal.

The flowmeter primary includes a flow tube 10 through which the liquid 11 to be measured is conducted. An electromagnet having a coil 12 is provided to establish a magnetic field which is transverse to the direction of flow. Electrodes 13 and 14 in contact with the flowing fluid are disposed at diametrically-opposed points on the flow tube on an axis which is perpendicular both to the longitudinal direction of flow and the transverse magnetic field.

As is well known, a voltage is induced in the liquid whose flow intersects the magnetic field, this voltage being transferred to the electrodes to produce a signal at flowmeter output terminals that reflects the flow rate. This signal is referred to as the flow-induced signal to distinguish it from spurious signal and harmonic noise components that are independent of flow rate.

Electromagnet coil 12 is energized by a relatively low-frequency square wave derived from a full-wave rectifier power supply constituted by a transformer 16 whose primary is connected to an a-c power line through a regulator 17, the line supplying the usual 50 or 60 Hz current. The secondary of transformer 16 is connected to the input junctions of a full-wave rectifier bridge 18, whose output junctions are connected to the respective movable contacts of two single-pole single-throw switches 19 and 20 whose fixed contacts are both connected to one end of magnet coil 12. The other end of the coil is connected to the center tap of the secondary of transformer 16.

When switch 19 is closed and switch 20 is simultaneously open, the rectified output is applied to the magnet coil in one polarity, and when switch 19 is open and switch 20 is simultaneously closed, the polarity is reversed. While for purposes of explanation, switches 19 and 20 are shown as mechanical devices, in practice these switches are in electronic form and may be constituted by thyratrons, triacs or any other type of electronic switching device in vacuum tube or solid state form.

Switches 19 and 20 are activated at a rate which is low relative to the frequency of the a-c line. This is accomplished by means of a presettable scaler or frequency divider 21 to which the 60 Hz line voltage is applied as a clock signal, the scaler yielding low frequency pulses in the order of $1\frac{7}{8}$, $3\frac{3}{4}$ or $7\frac{1}{2}$ Hz.

The low frequency pulses from the scaler are applied to the firing electrodes of the two triac switches (or whatever other electronic switching devices are used)

to alternately turn on the triacs and thereby connect either the positive or the negative side of the full-wave rectified 60 Hz voltage to the magnet coil. Thus when switch 19 is closed, current flows through the magnet coil in one direction, and when switch 20 is closed, current flows in the reverse direction.

Because the output of the full-wave rectifier is a raw, unfiltered direct voltage, it is composed of a continuous train of half-cycle pulses, all of the same polarity. But with the low-frequency switching action, the voltage applied to magnet coil 12 is periodically reversed in polarity, as a result of which the current passing through the coil has a 120 Hz ripple component.

Because the electromagnet has a relatively high inductance, it functions as a filter choke and, in practice, it takes out as much as 75% of the ripple component. The remaining portion of the 120 Hz ripple component that appears in the flow-induced signal is smoothed out at the summing junction of the secondary via the filter action of the associated error amplifier, to be later described. This obviates the need for filter capacitors associated with the choke, as in conventional filters. Thus, the system functions as if it were excited by a square wave having a substantially constant amplitude.

The Flowmeter Secondary

The flow induced signal appearing at output terminals 15 of the flowmeter primary is fed to a secondary constituted by a converter. This converter is essentially an all solid-state a-c feedback system producing a frequency output (and optimal current) whose rate is proportional to flow.

In the converter shown in FIG. 1, the flow-induced signal appearing at output terminals 15 of the flowmeter is applied to the first stage of the converter which is an a-c pre-amplifier 22. This signal has a generally square-wave formation but for the spikes appearing at the points of polarity reversal. These spikes are the result of switching transients or surges, and have a duration depending on the inductance-resistance time constant of the electromagnetic circuit.

The constant level portion of the square wave reflects the steady state condition of the magnetic field, and has an amplitude that is directly proportional to the velocity of liquid passing through the flow-tube. Hence it is only this portion of the signal which is of interest for accurate measurement purposes.

The output of pre-amplifier 22 is applied through a blocking capacitor 23 to one input of a summing junction 24 to whose other input is fed the output of a range attenuation circuit 25 from an error signal type of feedback loop. The error signal produced by a comparison of the flow signal and the feedback signal in the summing junction is amplified in an a-c error amplifier 26, which is provided with a subnegative feedback circuit 27 adapted to attenuate all frequencies lower and higher than that of the error signal.

The a-c output of error amplifier 26 is applied through a phase-inverting amplifier 28, whose output is applied to a 180° synchronous demodulator 29A. The output of amplifier 26 is applied directly to a synchronous demodulator 29B. The operation of demodulators 29A and 29B are synchronized with the low-frequency switching rate of the magnet coil and are so gated as to block the applied error signal at those points corresponding to the point of polarity reversal. In this way, the d-c output of the demodulator reflects only the steady state magnetic flux condition, the spiked portions of the flow-induced signal being suppressed.

In order to so synchronize the demodulators, the output of scaler 21 which responds to the 50 or 60 cycle signal to produce low-frequency control pulses for governing the electromagnetic switching action is also applied to a gating logic GL to produce gating pulses at the same low-frequency rate. Gating logic GL, in the course of each operating cycle, produces during the first half cycle a gating pulse $t_i$ which is applied to the 0° demodulator 29B to activate this demodulator for a given time interval, the demodulator otherwise being deactivated by a disabling pulse. In the second half cycle, gating logic GL produces a gating pulse $t_2$, which is applied to the 180° demodulator 29A to activate this demodulator for a given interval, this demodulator otherwise being disabled. The nature of these gating pulses and the manner in which they result in the rejection of harmonic noise will be considered, in the next section of the specification.

The d-c output pulses produced by demodulators 29 A and B are applied through resistors $R_1$ and $R_2$ to a capacitor 30, this network forming a resistance-capacitance integrating circuit R-C to produce a direct-voltage error signal whose magnitude is a function of flow rate. This error signal is applied to a direct-current amplifier 31, whose output is used as a controlled bias for a d-c to frequency converter 32 that, in practice, may take the form of a blocking oscillator.

The blocking oscillator translates the d-c error signal level to a variable frequency pulse train which exhibits a duty cycle that is proportional to the error signal. (Duty cycle is defined as the pulse width or on-time interval (t) divided by the total period ($\tau$). This variable duty cycle error signal is used to drive the output circuits of the system as well as serving as the take-off point for the error signal feedback circuit.

For purposes of feedback, the variable duty cycle error signal must first be restored to a proportional low-frequency signal (i.e., 1⅞ Hz or whatever low frequency is in effect). This is accomplished by means of a sampling circuit 33 coupled to the dc-to-duty cycle converter 32 and acting to sample an in-phase reference voltage RV derived from the electromagnetic circuit. To generate this reference voltage, a fractional-ohm resistor 34 is interposed between magnet coil 12 and the center tap of the secondary of transformer 16, the voltage drop thereacross depending on current flow through the magnet coil. This voltage is applied to an operational amplifier 35 to produce reference voltage RV at its proper level.

The output of sampler 33 is constituted by the duty-cycle pulses derived from the d-c to frequency converter, enveloped by the low frequency square wave reference voltage RV. This output is fed to summing junction 24 through the range attenuator 25. Inasmuch as this feedback signal depends on the amplitude of reference voltage RV, any variation in the voltage as a result of line fluctuations will proportionately change the feedback signal. Since it is the ratio of the flow-induced signal to the feedback signal that constitutes the measurement criterion, no significant loss of accuracy will be experienced with variations in line voltage.

The signal from the d-c-to-duty cycle converter is applied to a duty-cycle-to-d-c converter 36, which converts the pulses of the former into an analog d-c output that is proportional to fluid flow rate. The signal from the d-c-to-duty cycle converter is also applied to a pulse scaler 37 which converts the applied pulses into engineering units which are available to drive an external counter.

Noise Suppression

We shall first, in connection with FIG. 2, consider the operation of synchronous demodulators (S.D.M.) 29A and 29B in conjunction with integrator R-C to demonstrate how this noise suppression arrangement operates when synchronized with a 30 Hz drive frequency whose waveform is shown in line A. This drive frequency produces a 60 Hz even harmonic noise component whose waveform is shown in line B.

A full cycle of 60 Hz noise is developed in each half cycle of the 30 Hz drive frequency. The 0° synchronous demodulator is activated during the full first half cycle and the 180° synchronous demodulator is activated during the full second half cycle of the drive frequency. Because the outputs of these demodulators, as shown in line C, are out of phase, integration of these outputs produces a zero voltage, thereby suppressing the 60 Hz harmonic noise component.

In the situation shown in FIG. 3, where again we have a 30 Hz drive frequency in line A, and a 60 Hz harmonic noise component in line B, the 0° and 180° synchronous demodulators are activated only in the last half of each half cycle of the drive frequency. This 50% operation produces in the 0° and 180° demodulators, as shown in line 3, half cycle outputs at the even harmonic frequency which are of opposite phase. When these outputs are integrated, a zero voltage is produced.

The selection of time intervals $t_1$ and $t_2$, each less than or equal to time gap $\Delta t$, must be in accordance with the following criteria:

If the noise frequency is an even harmonic of the drive frequency, then $$t_1 = t_2$$

If the noise frequency is an odd harmonic of the drive frequency, then $$t_1 = k_1/f_{noise}$$
$$t_2 = k_2/f_{noise};$$

where $k_1$ and $k_2$ are constants which are integers.

These relationships state that $t_1$ and $t_2$ must contain an integral number of full cycles of the noise when $f_{noise}$ is an odd harmonic of the drive frequency.

Defining $\Delta t$ as the time gap from the end of $t_1$ to the beginning of $t_2$ and T as the period from the end of $t_1$ to the end of $t_2$ $$\Delta t + t_2 = T$$

or $$\frac{\Delta t}{T} + \frac{k_2}{T f_{noise}} = 1$$

Now $T = \frac{1}{2}(1/f_{drive})$, the period of a full half cycle of the drive $$\frac{\Delta t}{T} + \frac{k_2}{\frac{1}{2}(f_{noise}/f_{drive})} = 1$$

But $f_{noise}/f_{drive} = n$, the integer number of the harmonic being suppressed. Therefore $$\frac{\Delta t}{T} + \frac{2k_2}{n} = 1$$

or $$\frac{\Delta t}{T} = 1 - \frac{2k_2}{n} \text{ where } \frac{\Delta t}{T} \leq 1$$

This relationship establishes that the time gap may have a variety of values depending upon the harmonic to be suppressed.

If $n = 3$ (3rd Harmonic), $k_2$ can only be equal to 1, so that $\Delta t/T$ can only be equal to $\frac{1}{3}$. If $n = 5$, however, (5th harmonic), $k_2$ can be either 2 or 1 with the $\Delta t/T$ either 1/5 or 3/5, respectively.

In general, for the nth harmonic $$\Delta t/T = 1/n, \ 3/n, \ 5/n, \ \ldots \ (n-1)/n$$

where the numerator expresses the number of full half cycles of the harmonic contained in the time gap, $\Delta t$, and the denominator expresses the number of full half cycles in the period T.

From another viewpoint, the period T contains an odd number of full half cycles of an odd harmonic of the drive while $t_2$ (and $t_1$) must contain an even number of full half cycles in order to be suppressed. The time gap then must contain an odd number of full half cycles of the nth harmonic which is to be suppressed.

In a magnetic flowmeter of the type described, the period T is fixed, being controlled by the drive. The time gap required to suppress odd harmonics is $$\Delta t = (k_3/n) T$$

where $k_3$ is an odd integer and $k_3 < n$

Once the time gap, $\Delta t$, has been selected, it also remains fixed and it can be shown that suppression will be effective for all mth harmonics of the drive where $$m = k_4 n$$

and $k_4$ is an odd integer

For example, if $n = 3$, $k_3 = 1$ and $\Delta t = \frac{1}{3}T$:
The mth harmonics which will also be suppressed are $m = 9$ for $k_4 = 3$ $m = 15$ for $k_4 = 5$ $m = 21$ for $k_4 = 8$ As shown in FIG. 4, lines A and B, in order to suppress both even and odd harmonics, the 0° and 180° demodulators have error voltages applied thereto which are in phase operation. But these demodulators are only actuated in the respective half cycles of the drive frequency during gating intervals $t_1$ and $t_2$ which are of a duration shorter than a half cycle of the drive frequency, as shown in lines C and D. Thus applied to the common integrator, as shown in line E, are the demodulator signals developed during the gating intervals $t_1$ and $t_2$.

Gating interval $t_1$ takes place during the first half cycle of the drive frequency when the magnetic field is turned on and is at a constant flux level. Gating interval $t_2$ takes place during the second half cycle when the magnetic field is turned off or is at a constant flux level in the reverse direction. These intervals are of substantially equal duration, and in order to suppress all odd and selected even harmonics, the time gap $\Delta t$ between intervals $t_1$ and $t_2$ must be equal to an odd number of full half-cycles of the selected odd harmonics of the drive frequency.

We shall illustrate in FIG. 5 how an even order harmonic is suppressed, line A showing the 30 Hz drive frequency, line B a 60 Hz even harmonic noise component, and line C the output of the 0° S.D.M. during the first half cycle of the drive frequency followed by the output of the 180° S.D.M. during the second half cycle.

In this instance, gating intervals $t_1$ and $t_2$ which are equal to each other take place in the last 25% of the respective half cycles of the drive frequency, while the time gap $\Delta t$ therebetween is equal to three-quarters of the full cycle of the 60 Hz even harmonic frequency. The resultant outputs of the 0° and 180° demodulators which appear during the gating periods $t_1$ and $t_2$ are equal and opposite. When integrated, these outputs produce a zero voltage.

In the operation illustrated in FIG. 6, gating intervals $t_1$ and $t_2$ are equal to 75% of the full cycle of the 60 Hz harmonic noise component, and gap $\Delta t$ therebetween is equal to one half a half cycle of the 60 Hz wave. Here again, the resultant outputs of the 0° and 180° demodulators developed during the gating periods $t_1$ and $t_2$ are equal and opposite and when integrated produce a zero voltage.

We refer now to FIG. 7 which in line A shows a third harmonic noise component (90 Hz), the gating intervals $t_1$ and $t_2$ in this instance being equal to 50% of one half cycle of the 30 Hz drive frequency. The time gap $\Delta t$ is then equal to 75% of the third harmonic wave. As a consequence, the outputs of the 0° and 180° demodulators during gating intervals $t_1$ and $t_2$ do not, when integrated, produce a zero voltage, and noise suppression of this odd harmonic is not effected.

But as shown in FIG. 8, where gating intervals $t_1$ and $t_2$ are equal to $\frac{2}{3}$ of one half cycle of the drive frequency and time gap $\Delta t$ is equal to a full half cycle of the odd harmonic frequency, the resultant 0° and 180° outputs of the demodulators, when integrated, produce a zero voltage to effect harmonic suppression.

In other words, with respect to even-order harmonic noise components, suppression takes place as long as gating intervals $t_1$ and $t_2$ are equal; whereas for odd-order harmonic suppression, one requires that the gating intervals $t_1$ and $t_2$ each be equal to an integral number of full cycles, and thus the time gap $\Delta t$ be equal to an odd number of full half cycles of the odd harmonic frequency. It will be appreciated that the harmonic suppression circuit also functions in the manner explained in the above-identified Schmoock et al. patent to cancel out spurious or quadrature noise components.

While there has been shown and described a preferred embodiment of harmonic noise suppression in electromagnetic flowmeter in accordance with the invention, it will be appreciated that many changes and modifications may be made therein without, however, departing from the essential spirit thereof.

We claim:

1. In an electromagnetic flowmeter in which fluid to be metered passes through a flow tube to intersect a magnetic field whereby the voltage induced in the fluid is transferred to a pair of electrodes mounted on the tube to yield a flow-induced signal, the field being established by an electromagnet supplied with excitation current through a periodically-operated switch to create a magnetic field which during each operating cycle is alternately turned on and off or reversed in flux direction at a predetermined drive frequency, as a consequence of which the signal includes undesirable noise components formed by even and odd harmonics of the drive frequency; a converter responsive to said flow-induced signal to produce an output signal as a function of flow rate that is substantially free of said noise components, said converter comprising:

A. a pair of synchronous demodulators;
B. means to apply said flow-induced signal to said demodulators in phase opposition;
C. an integrator coupled to the outputs of both demodulators; and
D. gating means synchronizing the demodulators with said periodically-operated switch to cause one demodulator to pass its output to said integrator during the first half cycle of the drive frequency only in a first gating interval in which the magnetic field is turned on and is at a constant flux level, and thereafter to cause the other demodulator to pass its output to said integrator during the second half cycle of the drive frequency only in a second gating interval in which the magnetic field is turned off or is at a constant flux level in the reverse direction.

2. In an electromagnetic flowmeter as set forth in claim 1, wherein said first and second gating intervals are of substantially equal duration.

3. In an electromagnetic flowmeter as set forth in claim 2, wherein said first and second gating intervals are separated by a time gap equal to an odd number of full half cycles of an odd harmonic component of the drive frequency.

4. In an electromagnetic flowmeter as set forth in claim 1, wherein said first and second gating intervals each contain an odd number of full half cycles of the odd harmonic component to be suppressed.

5. In an electromagnetic flowmeter as set forth in claim 1, wherein said periodically-operated switch is actuated through a frequency divider coupled to a high-frequency a-c power line whereby the drive frequency is relatively low.

6. In an electromagnetic flowmeter as set forth in claim 5, wherein said gating means for gating said demodulators include gating logic coupled to said divider whereby said gating intervals are synchronized with the drive frequency.

7. In an electromagnetic flowmeter as set forth in claim 6, wherein said gating logic acts to disable said demodulators except during said gating intervals.

8. In an electromagnetic flowmeter as set forth in claim 1, wherein said integrator is constituted by a capacitor which is charged through a first resistor connected to the output of the one demodulator and is also charged through a second resistor connected to the output of the other demodulator.

* * * * *